(12) United States Patent
Nishikawa (10) Patent No.: US 6,882,484 B2
(45) Date of Patent: Apr. 19, 2005

(54) MAGNETIC TRANSFER SYSTEM (75) Inventor: Masakazu Nishikawa, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 112 days.

(21) Appl. No.: 10/603,084

(22) Filed: Jun. 25, 2003

(65) Prior Publication Data

US 2004/0114264 A1 Jun. 17, 2004

(30) Foreign Application Priority Data

Jun. 25, 2002 (JP) ........................................ 2002-184446

(51) Int. Cl.$^7$ ............................................... G11B 5/86
(52) U.S. Cl. ......................................... 360/17; 360/137
(58) Field of Search .............................. 360/15, 16, 17, 360/137

(56) References Cited

U.S. PATENT DOCUMENTS

2004/0109252 A1 * 6/2004 Hashi et al. .................. 360/17

FOREIGN PATENT DOCUMENTS

| JP | 63-183623 A | 7/1988 |
| JP | 10-40544 A | 2/1998 |
| JP | 10-269566 A | 10/1998 |
| JP | 2001-14667 A | 1/2001 |

* cited by examiner

Primary Examiner—Alan T. Faber
(74) Attorney, Agent, or Firm—Sughrue Mion, PLLC (57) ABSTRACT A magnetic transfer system includes magnetic recording medium stocker which holds a plurality of magnetic recording media, a magnetic transfer apparatus which magnetically transfers information represented by a magnetic layer on a master information carrier to the magnetic recording medium by applying a transfer magnetic field to the magnetic recording medium and the master information carrier with the magnetic recording medium and the master information carrier held in close contact with each other, and a conveyor which conveys the magnetic recording medium between the magnetic recording medium holding means and the magnetic transfer means. The magnetic recording medium holding stocker, the magnetic transfer apparatus and the conveyor are formed of material which contains substantially no chlorine, sulfur compound or nitric oxide at least at a part which is brought into contact with the magnetic recording medium.

8 Claims, 4 Drawing Sheets

MAGNETIC TRANSFER SYSTEM

BACKGROUND OF THE INVENTION

1. Field of the Invention

This invention relates to a magnetic transfer system for magnetically transferring information carried by a master information carrier to a magnetic recording medium.

2. Description of the Related Art

With an increase in information quantity, there is a demand for a magnetic recording medium which is high in memory capacity, low in cost and preferably requires a short time to read out a necessary part of data (a magnetic recording medium which allows so-called high-speed access). As an example of such a magnetic recording medium, there has been known a high recording density magnetic medium such as a hard disc, a zip (Iomega) and the like. In such a high recording density magnetic medium, the recording area is formed by narrow data tracks. In order to cause a magnetic head to accurately trace such narrow data tracks and reproduce the data at a high S/N ratio, the so-called servo tracking technique has been employed.

In order to perform the servo tracking, it is necessary to write servo information such as servo tracking signals for positioning the data tracks, address signals for the data tracks and reproduction clock signals on the magnetic recording medium as a preformat upon production thereof. At present, such preformat recording is performed by the use of a specialized servo recording apparatus (a servo track writer) However, the preformat recording by the conventional servo recording apparatus is disadvantageous in that it takes a long time since the servo information must be recorded on the magnetic recording medium one by one by the use of a magnetic head, which deteriorates the productivity.

As a method of recording the preformat accurately and efficiently, there has been proposed, for instance, in Japanese Unexamined Patent Publication Nos. 63(1988)-183623, 10(1998)-40544 and 10(1998)-269566, a magnetic transfer method in which a pattern which is formed on a master information carrier and represents servo information is copied to a magnetic recording medium (a slave medium) by magnetic transfer.

In the magnetic transfer, the magnetization pattern representing the information carried by a master information carrier is magnetically transferred from the master information carrier to a magnetic recording medium (a slave medium) by applying a transfer magnetic field to the slave medium and the master information carrier in close contact with each other, and accordingly, the information carried by the master information carrier can be statically recorded on the slave medium with the relative position between the master information carrier and the slave medium kept constant. Thus, according to the magnetic transfer, the preformat recording can be performed accurately and the time required for the preformat recording is very short.

We, this applicant, have proposed in Japanese Unexamined Patent Publication No. 2001-14667 a method of magnetic transfer in which the magnetization pattern on a master information carrier is magnetically transferred to the magnetic layer of a slave medium by forming the magnetic layer on the surface of the protruding portions of the master information carrier of soft magnetic material which is small in coercive force, initially magnetizing the magnetic layer of the slave medium in one direction of the recording tracks and applying a transfer magnetic field to the slave medium in the direction opposite to the direction of the initial-magnetization with the magnetic layer of the slave medium held in close contact with the soft magnetic layer of the master information carrier.

The magnetic transfer system for carrying out the magnetic transfer described above basically comprises a means for holding a magnetic recording medium (a slave medium), a means for conveying the magnetic recording medium and a magnetic transfer apparatus which applies a magnetic field to the slave medium and a master information carrier holding the slave medium and the master information carrier in close contact with each other, and materials such as rubber containing therein chlorine or sulfur are used in parts such as the means for holding the magnetic recording medium, the means for conveying the magnetic recording medium and the magnetic transfer apparatus which are brought into contact with the slave medium. However, there has been a problem that the magnetic recording medium (the slave medium), especially a hard disc, is readily attacked by chlorine, sulfur or nitric oxide and is eroded when brought into contact therewith. Further, it has been found that when residue containing therein chlorine, sulfur or nitric oxide adheres to the master information carrier, the magnetic layer on the master information carrier is eroded as well as the slave medium and the service life of the master information carrier is greatly shortened.

SUMMARY OF THE INVENTION

In view of the foregoing observations and description, the primary object of the present invention is to provide a magnetic transfer system which does not erode the slave medium or the master information carrier.

In accordance with the present invention, there is provided a magnetic transfer system comprising a magnetic recording medium holding means which holds a plurality of magnetic recording media, a magnetic transfer means which magnetically transfers information represented by a magnetic layer on a master information carrier to the magnetic recording medium by applying a transfer magnetic field to the magnetic recording medium and the master information carrier with the magnetic recording medium and the master information carrier held in close contact with each other, and a magnetic recording medium conveyor means which conveys the magnetic recording medium between the magnetic recording medium holding means and the magnetic transfer means, wherein the improvement comprises that the magnetic recording medium holding means, the magnetic transfer means and the magnetic recording medium conveyor means are formed of material which contains substantially no chlorine, sulfur compound and nitric oxide at least at parts which is brought into contact with the magnetic recording medium.

It is preferred that the magnetic transfer system of the present invention further comprises a master information carrier holding means which holds the master information carrier, and a master information carrier conveyor means which conveys the master information carrier between the master information carrier holding means and the magnetic transfer means, and the master information carrier holding means, the magnetic transfer means and the master information carrier conveyor means are formed of material which contains substantially no chlorine, sulfur compound and nitric oxide at least at parts which are brought into contact with the master information carrier.

In this specification, when a material contains any one of chlorine, sulfur compound and nitric oxide in an amount not larger than 0.5 ppm, the material should be considered to contain substantially no chlorine, sulfur compound and nitric oxide. The chlorine content, the sulfur compound content or the nitric oxide content is determined according to the following out-gas evaluation. Any one of the chlorine content, the sulfur compound content and the nitric oxide content is preferably not larger than 0.4 ppm and more preferably not larger than 0.2 ppm.

In the out-gas evaluation, ion chromatography is employed. For example, a sample piece of 5 g or so is cut out from a base material, and the sample piece is heated at 200° C. for five hours in a flow of $Ar/O_2$. The generated gas is dissolved in eluent of 1% $H_2O_2$ and each of chlorine, sulfur compound and nitric oxide is quantified.

In the case where a plurality of kinds of sulfur compounds are contained, the total content of sulfur compounds may be 0.5 ppm or more so long as the content of a sulfur compound which is contained in the material in the largest amount as detected by the aforesaid ion chromatography is not larger than 0.5 ppm. Similarly, in the case where a plurality of kinds of nitric oxides are contained, the total content of nitric oxides may be 0.5 ppm or more so long as the content of a nitric oxide which is contained in the material in the largest amount as detected by the aforesaid ion chromatography is not larger than 0.5 ppm.

Since $SO_4$ is generally contained in the material in the largest amount among sulfur compounds and $NO_3$ is generally contained in the material in the largest amount among nitric oxides, that the sulfur compound content or the nitric oxide content is not larger than 0.5 ppm is substantially equivalent to that the $SO_4$ content or the $NO_3$ content is not larger than 0.5 ppm.

The base material of the parts which are brought into contact with the magnetic recording medium of the magnetic recording medium holding means, the magnetic transfer means and the magnetic recording medium conveyor means and of the parts which are brought into contact with the master information carrier of the master information carrier holding means, the magnetic transfer means and the master information carrier conveyor means is preferably, for instance, polyimide, polyacetal, polyether kethone, polyimidoamide, polyether imide, polypropylene, tetrafluoroethylene resin, perfluorethylene-propylene or perfluoroalkoxyalkane.

The chlorine content, the sulfur compound content and the nitric oxide content can be reduced to not larger than 0.5 ppm, for instance, by purging gases from the base material by annealing the base material at elevated temperatures (about 200° C.) under vacuum for about 5 hours. The base material may contain chlorine, sulfur compound or nitric oxide in an amount larger than 0.5 ppm so long as the parts which are brought into direct contact with the magnetic recording medium of the magnetic recording medium holding means, the magnetic transfer means and the magnetic recording medium conveyor means and of the parts which are brought into direct contact with the master information carrier of the master information carrier holding means, the magnetic transfer means and the master information carrier conveyor means are coated with film of a material which contains substantially no chlorine, sulfur compound and nitric oxide. Such film maybe provided, for instance, by sputtering or ion plating. It is preferred that the film be formed of a solid material having lubricating properties such as sputtering carbon, DLC (diamond-like carbon), molybdenum disulfide, or titanium nitride. The film should be not smaller than 5 nm and smaller than 1 μm in thickness. When the thickness of the film is smaller 5 nm, the gas-barrier function of the film cannot be satisfactory. Further, when the thickness of the film is not smaller than 1 μm, external force added to the film during handling of the magnetic recording medium or the master information carrier can peel the film. Preferably, the thickness of the film is not smaller than 10 nm and not larger than 500 nm. The coating material can be brought into close contact with the base material, for instance, by carrying out ashing on the surface of the base material by the use of, for instance, oxygen gas or by forming an adherent layer of Si, Ti, Al or the like on the surface of the base material.

The expression "with the magnetic recording medium and the master information carrier held in close contact with each other" should be interpreted to include a situation where the magnetic recording medium and the master information carrier are held opposed to each other at a slight distance from each other as well as a situation where the magnetic recording medium and the master information carrier are held in full contact with each other.

As the master information carrier, those which carry information as a magnetization pattern of a magnetic layer and those which carry information as a pattern of a magnetic layer (so-called patterned masters) can be employed though the latter is preferred.

A patterned master comprising a substrate on which an irregularity pattern (a pattern of protruding portions and recessed portions) representing information to be transferred is formed and a magnetic layer formed on the irregularity pattern is especially preferable. A soft magnetic layer or a semi-hard magnetic layer is especially preferable as the magnetic layer.

It is preferred that the magnetic transfer by the use of the patterned master be carried out by initially DC-magnetizing the magnetic layer of the slave medium in one direction of the recording tracks and applying a transfer magnetic field to the slave medium in the direction opposite to the direction of the initial-DC-magnetization with the magnetic recording medium held in close contact with the patterned master.

In the magnetic transfer system of the present invention, since the parts which are brought into direct contact with the magnetic recording medium of the magnetic recording medium holding means, the magnetic transfer means and the magnetic recording medium conveyor means are formed of a material which contains substantially no chlorine, sulfur compound and nitric oxide, the magnetic recording medium is not brought into contact with chlorine, sulfur compound or nitric oxide and is not eroded, whereby magnetic recording media transferred with information can be produced at a high yield.

Further, when the parts which are brought into direct contact with the master information carrier of the master information carrier holding means, the magnetic transfer means and the master information carrier conveyor means are formed of a material which contains substantially no chlorine, sulfur compound or nitric oxide, the master information carrier is not eroded by chlorine, sulfur compound or nitric oxide, and the service life of the master information carrier can be elongated.

DESCRIPTION OF THE PREFERRED EMBODIMENTS

Figure 1:
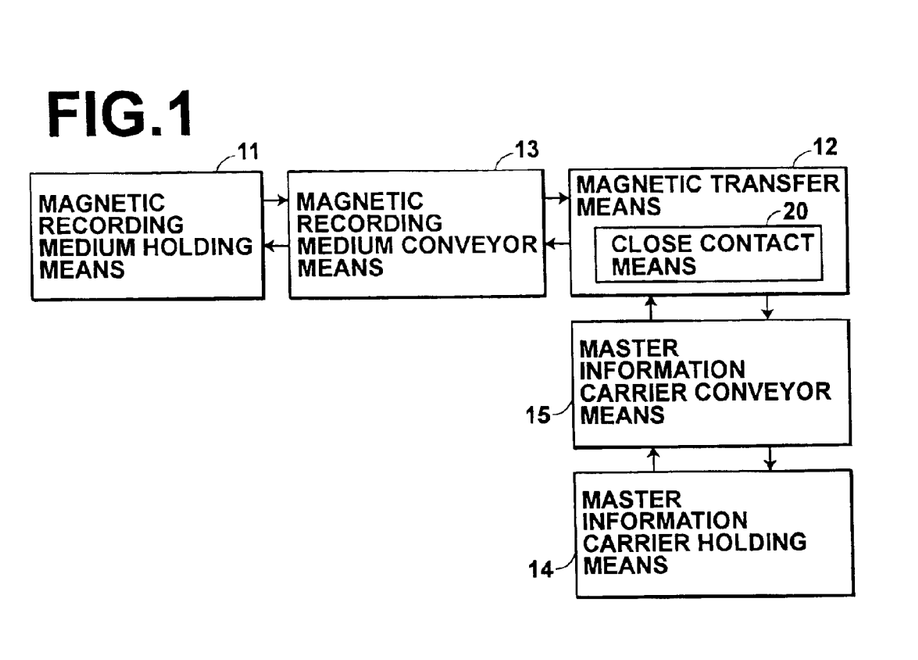
FIG. 1 is a block diagram showing a magnetic transfer system in accordance with an embodiment of the present invention.

In FIG. 1, a magnetic transfer system in accordance with an embodiment of the present invention comprises a magnetic recording medium holding means 11 which holds a plurality of virgin magnetic recording media 2 (FIG. 2), a magnetic transfer means 12 which magnetically transfers information on upper and lower master information carriers 3 and 4 to opposite sides of the magnetic recording medium 2, a magnetic recording medium conveyor means 13 which conveys the magnetic recording medium 2 from the magnetic recording medium holding means 11 to the magnetic transfer means 12 or from the magnetic transfer means 12 to the magnetic recording medium holding means 11, a master information carrier holding means 14 which holds the master information carrier 3 and 4, and a master information carrier conveyor means 15 which conveys the master information carriers 3 and 4 from the master information carrier holding means 14 to the magnetic transfer means 12 or from the magnetic transfer means 12 to the master information carrier holding means 14.

That is, a virgin magnetic recording medium 2 held in the magnetic recording medium holding means 11 is conveyed to the magnetic transfer means 12 by the magnetic recording medium conveyor means 13, and after magnetic transfer, the magnetic recording medium 2 is returned to the magnetic recording medium holding means 11 by the conveyor means 13. Another magnetic recording medium holding means 11 and another conveyor means 13 maybe provided so that after magnetic transfer, the magnetic recording medium 2 is conveyed to said another magnetic recording medium holding means 11 by said another conveyor means 13.

A master information carrier or a pair of master information carriers held in the master information carrier holding means 14 are conveyed to the magnetic transfer means 12 by the master information carrier conveyor means 15, and after magnetic transfer, the master information carriers are returned to the master information carrier holding means 14 by the conveyor means 15.

Figure 2:
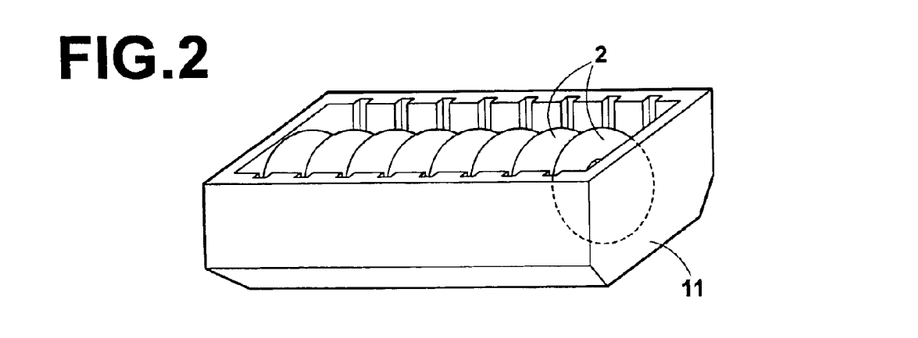
FIG. 2 is a perspective view showing a magnetic recording medium stocker.

In FIG. 2, a magnetic recording medium stocker (a magnetic recording medium holding means) 11 is for holding a plurality of magnetic recording media 2 when conveying the magnetic recording media 2 from a processing unit, for instance, for varnishing to be performed prior to the magnetic transfer to the magnetic transfer means 12 or from the magnetic transfer means 12 to a processing unit, for instance, for assembly to be performed after the magnetic transfer. The magnetic recording medium stocker 11 is provided with inner grooves so that a plurality of magnetic recording media 2 can be held upright and formed of a material which contains substantially no chlorine, sulfur compound and nitric oxide. The master information carrier holding means 15 is in the form of a similar stocker formed of a material which contains substantially no chlorine, sulfur compound and nitric oxide.

Figure 3:
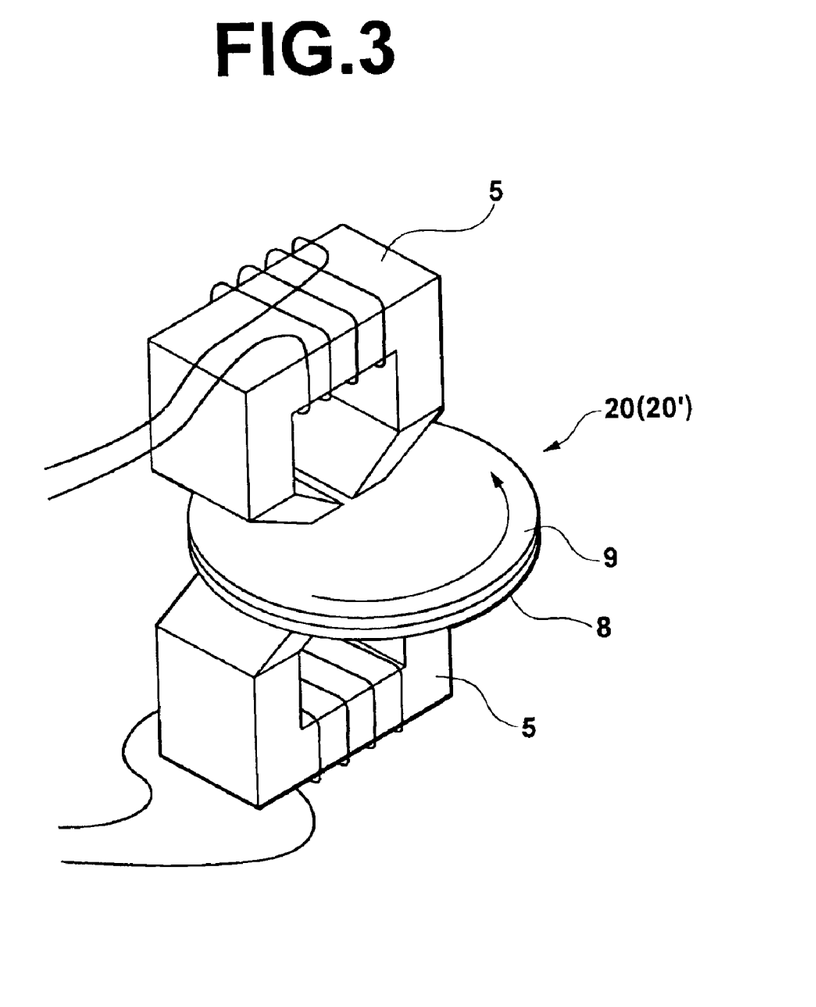
FIG. 3 is a fragmentary perspective view showing an important part of the magnetic transfer means.

The magnetic transfer means 12 comprises, as shown in FIG. 3, a close contact means 20 (20') and upper and lower electromagnet units 5.

Figure 4:
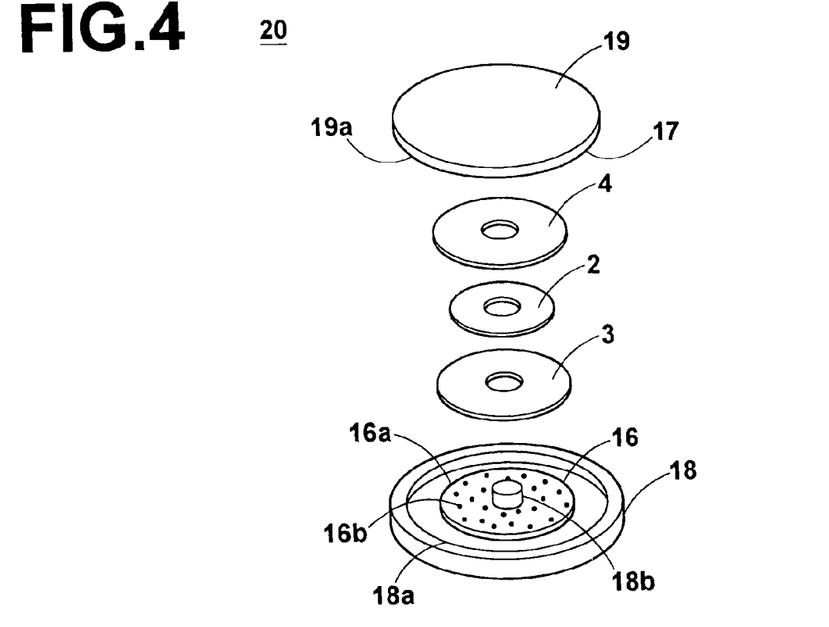
FIG. 4 is an exploded perspective view showing the close contact means for the simultaneous transfer.

FIG. 4 shows a close contact means 20 to be used when a pair of pieces of information are to be recorded simultaneously on opposite sides of the magnetic recording medium (will be referred to as "the simultaneous transfer", hereinbelow). As shown in FIG. 4, the close contact means 20 for the simultaneous transfer comprises lower and upper pressing members 18 and 19 respectively provided with lower and upper correcting members 16 and 17. The lower and upper pressing members 18 and 19 sandwich an assembly of lower and upper master information carriers 3 and 4 and a magnetic recording medium 2 therebetween and presses them against each other with their centers aligned with each other. The lower master information carrier 3 carries on the upper surface thereof information (e.g., a servo signal) to be transferred to the lower recording surface of the magnetic recording medium 2, and the upper master information carrier 4 carries on the lower surface thereof information (e.g., a servo signal) to be transferred to the upper recording surface of the magnetic recording medium 2.

The lower correcting member 16 attracts the lower master information carrier 3 against its surface under vacuum to correct the flatness of the lower master information carrier 3, and the upper correcting member 17 attracts the upper master information carrier 4 against its surface under vacuum to correct the flatness of the upper master information carrier 4.

Each of the lower and upper master information carriers 3 and 4 is in the form of a rigid disc and is provided on its one side with fine irregularity pattern which represents the information to be transferred to the magnetic recording medium 2 and is brought into close contact with the recording surface of the medium 2. The other side of the lower or upper master information carrier 3 or 4 is attracted against the surface of the lower or upper correcting member 16 or 17. In order to increase the intimacy between the master information carrier and the magnetic recording medium 2, each of the lower and upper master information carriers 3 and 4 is provided with a plurality of small through holes, formed in areas where the through holes do not communicate with suction holes in the correcting members 16 and 17 to be described later and do not interfere with the irregularity pattern on the master information carrier, to purge air between the magnetic recording medium 2 and the master information carrier.

The lower correcting member 16 (the upper correcting member 17 is of the same structure) is equivalent to the master information carrier 3 in shape and size and is provided with an attracting face 16a. About 25 to 100 suction ports 16b (not smaller than about 2 mm in diameter) open uniformly in the attracting face 16a. The suction ports 16b are connected to a vacuum pump (not shown) through an air passage (not shown) formed through the lower correcting member 16 and the lower pressing member 18 and attracts the back face of the master information carrier 3 against the attracting surface under vacuum to force the master information carrier 3 to follow the attracting face 16a, thereby correcting flat the master information carrier 3.

The lower and upper pressing members 18 and 19 are disc-like in shape and one or both of the lower and upper pressing member 18 and 19 are movable toward and from each other in the axial direction so that they are opened and closed, for instance, by an opening and closing mechanism (not shown). Annular collar portions 18a and 19a are formed along the peripheries of the pressing members 18 and 19 and are brought into abutment against each other, when the pressing members 18 and 19 are closed, to hermetically enclose the space formed between the pressing members 18 and 19. A locator pin 18b is erected at the center of the lower pressing member 18 and engages with a central opening of the recording medium 2 to locate the recording medium 2. The lower and upper pressing members 18 and 19 are integrally rotated by a rotating mechanism (not shown).

In order to perform the simultaneous transfer on a plurality of recording media 2 with a single set of lower and upper master information carriers 3 and 4 in sequence, the close contact means 20 keeps the lower and upper master information carriers 3 and 4 attracted under vacuum against the attracting face of the lower and upper correcting members 16 and 17 with the lower and upper master information carriers 3 and 4 centered. With the lower and upper pressing members 18 and 19 opened, that is, with the lower and upper pressing members 18 and 19 held away from each other, a magnetic recording medium 2 is set in place between the lower and upper master information carriers 3 and 4 and the lower and upper pressing members 18 and 19 are closed so that the lower and upper master information carriers 3 and 4 are brought into close contact with opposite sides of the magnetic recording medium 2. Thereafter, the lower and upper electromagnet units 5 are brought close to the lower and upper sides of the close contact means 20 and apply transfer magnetic fields while rotating the close contact means 20, whereby the pieces of information respectively carried by the lower and upper master information carriers 3 and 4 are magnetically transferred to the lower and upper recording faces of the magnetic recording medium 2.

Figure 5:
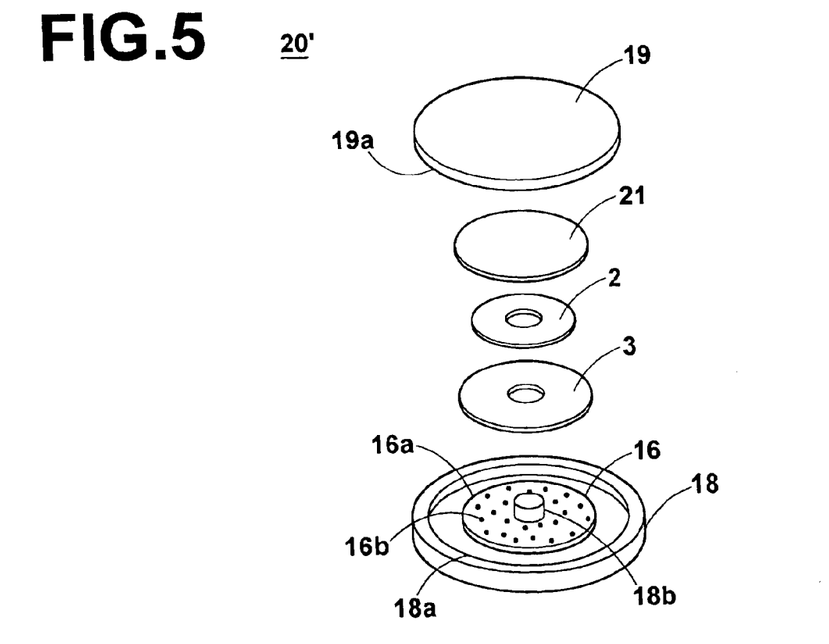
FIG. 5 is an exploded perspective view showing the close contact means for the sequential transfer.

FIG. 5 shows a close contact means 20' to be used when a pair of pieces of information are to be recorded on opposite sides of the magnetic recording medium in sequence (will be referred to as "the sequential transfer", hereinbelow). As shown in FIG. 5, the close contact means 20' for the sequential transfer comprises lower and upper pressing members 18 and 19 respectively provided with a lower correcting member 16 and an elastic disc (a cushioning disc) 21. The lower and upper pressing members 18 and 19 sandwich an assembly of lower master information carrier 3 and a magnetic recording medium 2 therebetween and presses them against each other with their centers aligned with each other. The lower master information carrier 3 carries on the upper surface thereof information (e.g., a servo signal) to be transferred to the lower recording surface of the magnetic recording medium 2.

The lower correcting member 16 attracts the lower master information carrier 3 against its surface under vacuum to correct the flatness of the lower master information carrier 3.

The close contact means 20' for the sequential transfer is substantially the same as the close contact means 20 for the simultaneous transfer shown in FIG. 4 except that the elastic disc 21 is employed in place of the upper master information carrier 4 and the upper correcting member 17 is eliminated.

The elastic disc 21 is formed of elastic material and held by the upper pressing member 19. The elastic disc 21 is deformed to follow the shape of the magnetic recording medium 2 when the lower and upper pressing members 18 and 19 are pressed against each other, and recovers its original shape when the magnetic recording medium 2 is separated from the master information carrier 3. The face of the elastic disc 21 facing the magnetic recording material 2 is parallel to the surface of the master information carrier 3 or convex toward the magnetic recording medium 2.

In order to perform the sequential transfer on a plurality of recording media 2 with a single lower master information carrier 3 in sequence, the close contact means 20' keeps the lower master information carrier 3 attracted under vacuum against the attracting face 16a of the lower correcting member 16 with the center of the lower master information carrier 3 aligned with the center of the attracting face 16a of the lower correcting member 16. With the lower and upper pressing members 18 and 19 opened, that is, with the lower and upper pressing members 18 and 19 held away from each other, a magnetic recording medium 2 is set in place between the lower master information carrier 3 and the elastic disc 21 and the lower and upper pressing members 18 and 19 are closed so that the lower master information carrier 3 is brought into close contact with the lower side of the magnetic recording medium 2 under the elasticity of the elastic disc 21. Thereafter, the lower and upper electromagnet units 5 are brought close to the lower and upper sides of the close contact means 20 and apply transfer magnetic fields while rotating the close contact means 20, whereby the information carried by the lower master information carrier 3 is magnetically transferred to the lower recording face of the magnetic recording medium 2. Another master information carrier is brought into close contact with the other side of the magnetic recording medium 2 in a subsequent step and the information carried by the master information carrier is magnetically transferred to the other recording face of the magnetic recording medium 2.

In the case of the close contact means 20 for the simultaneous transfer, the lower and upper master information carriers 3 and 4 and the locator pin 18b which are brought into contact with the magnetic recording medium 2 are formed of material which contains substantially no chlorine, sulfur compound and nitric oxide. In the case of the close contact means 20 for the sequential transfer, the master information carrier 3, the elastic disc 21 and the locator pin 18b which are brought into contact with the magnetic recording medium 2 are formed of material which contains substantially no chlorine, sulfur compound or nitric oxide. In the case of the master information carrier whose irregularity pattern is formed by the use of resist, the residual resist can contain sulfur. Accordingly, the master information carrier is cleaned of residual resist by dry cleaning before brought into close contact with the magnetic recording medium 2. It is preferred that the other part of the close contact system 20 or 20' be formed of material which contains substantially no chlorine, sulfur compound or nitric oxide.

The magnetic recording medium conveyor means 13 conveys the magnetic recording medium 2 from the magnetic recording medium holding means 11 to the magnetic transfer means 12 or from the magnetic transfer means 12 to the magnetic recording medium holding means 11. The magnetic recording medium conveyor means 13 comprises, for instance, a robot arm provided with a chucking portion which chucks the magnetic recording medium 2 at its inner opening. The chucking portion is formed of material which contains substantially no chlorine, sulfur compound or nitric oxide. The master information carrier conveyor means 15 is of the same structure and its chucking portion which chucks the master information carrier is formed of material which contains substantially no chlorine, sulfur compound or nitric oxide.

The base material of the stockers, of the locator pin and the elastic disc of the close contact means and of the robot arms may be, for instance, polyimide, polyacetal, polyether kethone, polyimidoamide, polyether imide, polypropylene, tetrafluoroethylene resin, perfluorethylene-propylene or perfluoroalkoxyalkane. The chlorine content, the sulfur compound content and the nitric oxide content can be reduced to not larger than 0.5 ppm, for instance, by purging gases from the base material by annealing the base material in the state of mass at elevated temperatures (about 200° C.) under vacuum for about 5 hours. The base material may contain chlorine, sulfur compound or nitric oxide in an amount larger than 0.5 ppm so long as the parts which are brought into direct contact with the magnetic recording medium or the master information carrier are coated with film of a material which contains substantially no chlorine, sulfur compound and nitric oxide. Such film may be provided, for instance, by sputtering or ion plating. It is preferred that the film be formed of a solid material having lubricating properties such as sputtering carbon, DLC (diamond-like carbon), molybdenum disulfide, or titanium nitride. The thickness of the film should be not smaller than 5 nm and smaller than 1 μm and preferably, is not smaller than 10 nm and not larger than 500 nm. The coating material can be brought into close contact with the base material, for instance, by carrying out ashing on the surface of the base material by the use of, for instance, oxygen gas or by forming an adherent layer of Si, Ti, Al or the like on the surface of the base material.

The magnetic transfer steps in the magnetic transfer system of this embodiment will be described in brief, hereinbelow. The master information carriers 3 and 4 held in the master information carrier holding means 15 set in the close contact means 20 one by one chucked at its inner opening. Whereas, in the magnetic recording medium holding means 11, a plurality of magnetic recording media 2 which have been initially-magnetized in one direction of the recording tracks are held. The magnetic recording medium 2 is conveyed to the close contact means 20 one by one chucked at its inner opening and set in place in the slave medium receiving portion of the close contact means. Then the master information carriers 3 and 4 are brought into close contact with the magnetic recording medium, and with the master information carriers 3 and 4 held in close contact with the magnetic recording medium 2, the magnetic transfer is carried out in the manner described above. At this time, the transfer magnetic field is applied in the direction opposite to the direction of the initial-magnetization. Thereafter, the magnetic recording medium 2 carrying thereon transferred information is conveyed to the magnetic recording medium holding means 11 by the conveyor means 13.

In the magnetic transfer system of this embodiment, since all the parts which are brought into contact with the magnetic recording medium and the master information carrier are formed of material which contains substantially no chlorine and sulfur, erosion of the master information carriers and the magnetic recording medium is suppressed and the magnetic recording media transferred with information can be produced at a high yield.

Figure 6A:
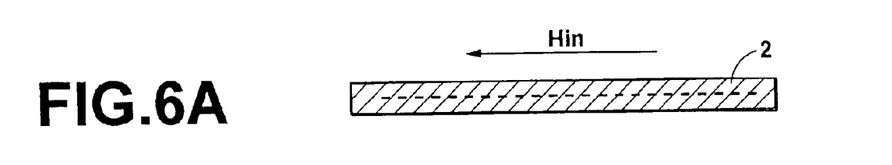
FIGS. 6A to 6C are views for illustrating the principle of magnetic transfer.
Figure 6B:
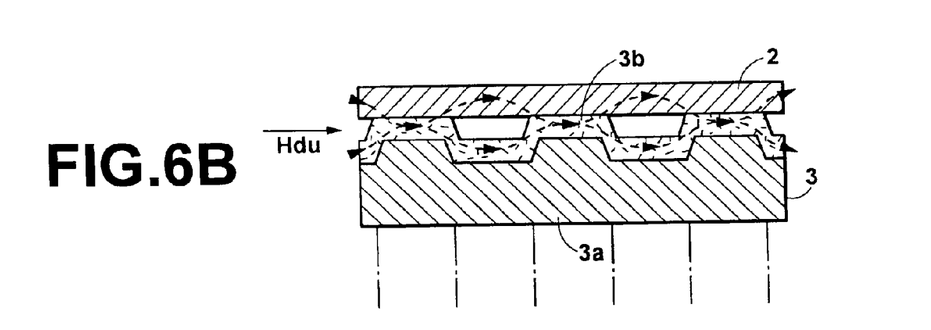
Figure 6C:
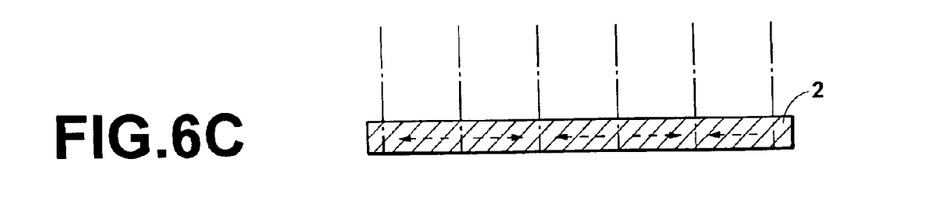

The principle of magnetic transfer in the magnetic transfer system of this embodiment will be described with reference to FIGS. 6A to 6C, hereinbelow. In the magnetic transfer system of this embodiment, information represented by an irregularity pattern on a substrate 3a of a master information carrier comprising the substrate and a magnetic layer 3b formed along the face of the substrate having the irregularity pattern is transferred from the master information carrier to a slave medium (magnetic recording medium) 2. In FIGS. 6A to 6C, only the lower magnetic layer of the magnetic recording medium 2 is shown.

An initial DC magnetic field Hin is first applied to the slave medium 2 in one direction of the recording tracks thereof, thereby magnetizing the magnetic layer of the slave medium 2 as shown in FIG. 6A. Thereafter, the magnetic layer 3b of the master information carrier 3 is brought into close contact with the magnetic layer of the slave medium 2. In this state, a transfer magnetic field Hdu is applied in the direction opposite to the initial DC magnetic field Hin as shown in FIG. 6B, thereby magnetically transferring the information on the master information carrier 3 to the lower magnetic layer of the slave medium 2. As a result, information represented by the irregularity pattern on the master information carrier 3 is magnetically transferred to the slave medium 2 as shown in FIG. 6C.

In the case where the irregularity pattern representing information to be transferred is a negative pattern reverse to the positive pattern shown in FIGS. 6A to 6C, the information can be magnetically transferred to the slave medium 2 by reversing the directions of the initial DC magnetic field Hin and the transfer magnetic field Hdu.

In the case where the substrate 3a of the master information carrier 3 is of ferromagnetic material such as Ni, the magnetic transfer can be carried out even if the irregularity pattern is not provided with the magnetic layer 3b. However, by providing the magnetic layer 3b, better magnetic transfer can be carried out. In the case where the substrate 3a of the master information carrier 3 is of non-magnetic material, it is necessary to provide the magnetic layer 3b.

When a protective film such as of DLC (diamond-like carbon) is provided on the outermost layer, the durability of the master information carrier 3 is improved and the master information carrier 3 comes to withstand a more number of times of magnetic transfer. Si film may be formed under the DLC protective film by, for instance, sputtering.

Though, in the embodiment described above, the patterned master is employed, the similar effect can be obtained by forming the parts which are brought into contact with the magnetic recording medium of material which contains substantially no chlorine, sulfur compound and nitric oxide even if a different master information carrier, such as a master information carrier in which a magnetization pattern is formed on a magnetic layer of a strong coercive force.

Experiments

Magnetic transfer systems in accordance with the present invention (first to eighth embodiments=emb1 to emb8) and in accordance with controls (first and second comparative examples=ex1 and ex2) were prepared and evaluated in the following manner.

The master information carriers and the magnetic recording media employed in the magnetic transfer systems were as follows.

Each of the master information carriers comprised a nickel disc substrate formed by a stamper method. The nickel disc functions as a soft magnetic layer which increases the magnetic flux absorbing effect. An irregularity pattern, representing a signal, was formed on the disc substrate in the region between a distance of 20 mm from the center thereof to a distance of 40 mm from the center thereof. The track width was 1.0 μm and the track pitch was 1.1 μm. The bit length was 0.2 μm at the innermost track at a distance of 20 mm from the center of the disc substrate and the height of protruding portions (the depth of the recessed portions) was 0.2 μm.

A magnetic layer comprising 30 at % of FeCo was formed on the Ni disc substrate by sputtering with the disc substrate held at 25° C. The Ar sputtering pressure was 0.15 Pa (1.0 mTorr) and the introduced power was 2.80 W/cm$^2$. A DLC protective layer was formed on the magnetic layer in thickness of 5 nm.

Each of the magnetic recording media (slave media) was a 3.5" magnetic recording disc and was produced by the use of a vacuum metallizer (S-50S sputtering device from Shibaura Mechatronics). That is, the vacuum metallizer was first evacuated to $1.33 \times 10^{-5}$ Pa ($1.0 \times 10^{-7}$ Torr) and then Ar was introduced into the vacuum metallizer to 0.4 Pa (3.0 mTorr). Under the condition, a glass plate was heated to 200° C. and a magnetic layer comprising 30 nm thick CrTi film and 30 nm thick CoCrPt film was formed on the glass plate. The magnetic layer was 5.7 T (4500 Gauss) in saturation magnetization Ms and 199 kA/m (25000e) in coercive force Hc.

In the first embodiment, the part which was brought into contact with the slave medium (will be referred to as "the slave medium handling part) and the part which was brought into contact with the master information carrier (will be referred to as "the master information carrier handling part) were formed of polyether kethone A. The material was 0.3 ppm, 0.3 ppm and 0.3 ppm respectively in chlorine gas content, $NO_3$ gas content and $SO_4$ gas content. Since $SO_4$ gas was contained in the material in the largest amount among sulfur compound gases and $NO_3$ was contained in the material in the largest amount among nitric oxide gases, the sulfur compound gas content and the nitric oxide gas content were represented by the $SO_4$ gas content and the $NO_3$ gas content (the same in all the other embodiments and the comparative examples).

In the second embodiment, the slave medium handling part and the master information carrier handling part were formed of polyether kethone B. The material was 0.2 ppm or less (smaller than the resolving power of the analyzer used) in any one of the chlorine gas content, the $NO_3$ gas content and the $SO_4$ gas content.

In the third embodiment, the slave medium handling part and the master information carrier handling part were formed of polyether kethone A and coated with 10 nm thick DLC protective film. The gas contents of the polyether kethone A was the same as that used in the first embodiment. The material was 0.2 ppm or less (smaller than the resolving power of the analyzer used) in any one of the chlorine gas content, the $NO_3$ gas content and the $SO_4$ gas content after coated with the DLC protective film.

In the fourth embodiment, the slave medium handling part and the master information carrier handling part were formed of polyimide. The material was 0.2 ppm or less (smaller than the resolving power of the analyzer used) in any one of the chlorine content, the $NO_3$ content and the $SO_4$ content.

In the fifth embodiment, the slave medium handling part and the master information carrier handling part were formed of perfluoroalkoxyalkane A and coated with 100 nm thick DLC protective film. The gas contents of the perfluoroalkoxyalkane A was 0.7 ppm, 0.8 ppm and 0.9 ppm respectively in chlorine gas content, $NO_3$ gas content and $SO_4$ gas content. The material was 0.2 ppm or less (smaller than the resolving power of the analyzer used) in any one of the chlorine gas content, the $NO_3$ gas content and the $SO_4$ gas content after coated with the DLC protective film.

The sixth embodiment was the same as the fifth embodiment except that the DLC protective film was 5 nm thick. The material was 0.4 ppm, 0.5 ppm and 0.4 ppm respectively in chlorine gas content, $NO_3$ gas content and $SO_4$ gas content after coated with the DLC protective film.

The seventh embodiment was the same as the fifth embodiment except that the DLC protective film was 1.5 μm thick. The material was 0.2 ppm or less (smaller than the resolving power of the analyzer used) in any one of the chlorine gas content, the $NO_3$ gas content and the $SO_4$ gas content after coated with the DLC protective film.

In the eighth embodiment, the slave medium handling part and the master information carrier handling part were formed of perfluoroalkoxyalkane. The gas contents of the perfluoroalkoxyalkane B was 0.5 ppm, 0.4 ppm and 0.3 ppm respectively in chlorine gas content, $NO_3$ gas content and $SO_4$ gas content.

The magnetic transfer system the first comparative example was formed of nitrile rubber (NBR). The gas contents of the NBR was 1.2 ppm, 0.9 ppm and 0.9 ppm respectively in chlorine gas content, $NO_3$ gas content and $SO_4$ gas content.

The second comparative example was the same as the fifth embodiment except that the DLC protective film was not provided.

The durability of the master information carrier and the slave medium were evaluated in the following manner and reported in the following table.

The master information carrier and the slave medium were repeatedly brought into contact with each other at $4.9 \times 10^{-5}$ Pa (5.0 kgf/cm$^2$) and separated from each other 10000 times, and then were held for one week under an atmosphere of 40° C.-90RH %. Then the surface of the master information carrier and the slave medium were observed in random 500 fields through a differential interference microscope at 480X. When deposit and/or crack (eroded portions) were observed in the magnetic layer at two or less places in the 500 fields, the master information carrier or the slave medium was evaluated as excellent (○), when deposit and/or crack were observed in the magnetic layer at 3 or 4 places in the 500 fields, the master information carrier or the slave medium was evaluated as acceptable (Δ), and when deposit and/or crack were observed in the magnetic layer at 5 or more places in the 500 fields, the master information carrier or the slave medium was evaluated as unacceptable (X).

Further, the slave medium was set to an electromagnetic conversion property meter (SS-60 from Kyodo Electronics) and the head (a GMR head which was 0.12 μm in reproduction head gap, 0.41 μm in reproduction track width, 0.2 μm in recording head gap and 0.67 μm in recording track width) was caused to scan the slave medium 10000 times in the region between a distance of 15 mm from the center thereof to a distance of 40 mm from the center thereof at a speed of 1 reciprocation/second (with a linear speed at a distance 40 mm of 10 m/sec.). Thereafter the slave medium was taken out the electromagnetic conversion property meter and was observed through a differential interference microscope at 50X.

When scraping is not observed, the slave medium was evaluated as excellent (○), and when scraping is observed, the slave medium was evaluated as unacceptable (X).

TABLE

|  | number of eroded portions on master |  | number of eroded portions on slave |  | shaving on slave |
|---|---|---|---|---|---|
| emb 1 | 1 | ○ | 1 | ○ | ○ |
| emb 2 | 2 | ○ | 1 | ○ | ○ |
| emb 3 | 0 | ○ | 0 | ○ | ○ |
| emb 4 | 0 | ○ | 0 | ○ | ○ |
| emb 5 | 1 | ○ | 1 | ○ | ○ |
| emb 6 | 4 | Δ | 3 | Δ | ○ |

TABLE-continued

| | number of eroded portions on master | | number of eroded portions on slave | | shaving on slave |
|---|---|---|---|---|---|
| emb 7 | 3 | Δ | 2 | ○ | ○ |
| emb 8 | 2 | ○ | 3 | Δ | ○ |
| ex 1 | 8 | X | 12 | X | X |
| ex 2 | 7 | X | 10 | X | X |

As can be understood from the table above, the first to eighth embodiments were acceptable or excellent in any of the evaluations, whereas the first and second comparative examples were unacceptable in any of the evaluations.

What is claimed is:

1. A magnetic transfer system comprising
   a magnetic recording medium holding means which holds a plurality of magnetic recording media,
   a magnetic transfer means which magnetically transfers information represented by a magnetic layer on a master information carrier to the magnetic recording medium by applying a transfer magnetic field to the magnetic recording medium and the master information carrier with the magnetic recording medium and the master information carrier held in close contact with each other, and
   a magnetic recording medium conveyor means which conveys the magnetic recording medium between the magnetic recording medium holding means and the magnetic transfer means, wherein the improvement comprises that
   the magnetic recording medium holding means, the magnetic transfer means and the magnetic recording medium conveyor means are formed of material which contains substantially no chlorine, sulfur compound or nitric oxide at least at parts which are brought into contact with the magnetic recording medium.

2. A magnetic transfer system as defined in claim 1 which further comprises a master information carrier holding means which holds the master information carrier, and
   a master information carrier conveyor means which conveys the master information carrier between the master information carrier holding means and the magnetic transfer means, and in which
   the master information carrier holding means, the magnetic transfer means and the master information carrier conveyor means are formed of material which contains substantially no chlorine, sulfur compound and nitric oxide at least at parts which are brought into contact with the master information carrier.

3. A magnetic transfer system as defined in claim 2 in which the base material of the parts which are brought into contact with the magnetic recording medium of the magnetic recording medium holding means, the magnetic transfer means and the magnetic recording medium conveyor means and of the parts which are brought into contact with the master information carrier of the master information carrier holding means, the magnetic transfer means and the master information carrier conveyor means is selected from the group consisting of polyimide, polyacetal, polyether kethone, polyimidoamide, polyether imide, polypropylene, tetrafluoroethylene resin, perfluorethylene-propylene and perfluoroalkoxyalkane.

4. A magnetic transfer system as defined in claim 2 in which the parts which are brought into direct contact with the magnetic recording medium of the magnetic recording medium holding means, the magnetic transfer means and the magnetic recording medium conveyor means and of the parts which are brought into direct contact with the master information carrier of the master information carrier holding means, the magnetic transfer means and the master information carrier conveyor means are coated with film of a material which contains substantially no chlorine, sulfur compound and nitric oxide.

5. A magnetic transfer system as defined in claim 4 in which the film is formed of a solid material having lubricating properties such as sputtering carbon, diamond-like carbon, molybdenum disulfide, or titanium nitride.

6. A magnetic transfer system as defined in claim 4 in which the film is not smaller than 5 nm and smaller than 1 μm in thickness.

7. A magnetic transfer system as defined in claim 4 in which the coating material is in close contact with the base material by way of an adherent layer of Si, Ti, Al or the like on the surface of the base material.

8. A magnetic transfer system as defined in claim 1 in which a patterned master is employed as the master information carrier.

* * * * *